(12) United States Patent
Lorenzo

(10) Patent No.: US 7,243,987 B1
(45) Date of Patent: Jul. 17, 2007

(54) APPARATUS AND METHOD FOR NOISE REDUCTION IN A VEHICLE

(75) Inventor: Randy Lorenzo, New Hudson, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 11/343,669

(22) Filed: Jan. 31, 2006

(51) Int. Cl.
*B60J 7/00* (2006.01)

(52) U.S. Cl. ..................................... 296/208
(58) Field of Classification Search ............... 296/208, 296/39.3; 174/72 A, 151, 153 G, 36
See application file for complete search history.

(56) References Cited

U.S. PATENT DOCUMENTS

| | | | | |
|---|---|---|---|---|
| 3,985,951 A | * | 10/1976 | Harris | 174/110 F |
| 4,653,155 A | * | 3/1987 | Hara | 24/16 PB |
| 5,490,664 A | * | 2/1996 | Justus et al. | 269/66 |
| 5,535,511 A | * | 7/1996 | Karasik | 29/872 |
| 5,897,157 A | * | 4/1999 | Yamaguchi et al. | 296/146.7 |
| 6,027,679 A | * | 2/2000 | O'Brien et al. | 264/272.14 |
| 6,092,854 A | * | 7/2000 | Campbell | 296/70 |
| 6,120,327 A | * | 9/2000 | O'Brien et al. | 174/72 A |
| 6,419,533 B2 | * | 7/2002 | Lecours | 440/38 |
| 6,503,098 B2 | * | 1/2003 | Aoki et al. | 439/502 |
| 6,506,974 B2 | * | 1/2003 | Nakata | 174/153 G |
| 6,796,834 B2 | * | 9/2004 | Suzuki et al. | 439/545 |
| 6,830,225 B2 | * | 12/2004 | Kato | 248/49 |
| 7,090,284 B2 | * | 8/2006 | Cowelchuk et al. | 296/208 |

* cited by examiner

*Primary Examiner*—Kiran B. Patel
(74) *Attorney, Agent, or Firm*—Young Basile Hanlon MacFarlane & Helmholdt, PC

(57) ABSTRACT

An area-reducing surface texture applied to a noise-prone portion of a vehicle panel or part where it makes contact with an unsecured length of wire harness, duct or other conduit. A plurality of small spaced structures is formed on or in the surface with their distal ends in contact with the wire harness, duct or other conduit. The total area of the contact ends of the structures is less than the original noise-prone surface area. This reduces the area of contact between the noise-prone portion of the panel and the wire harness, duct or other conduit.

10 Claims, 5 Drawing Sheets

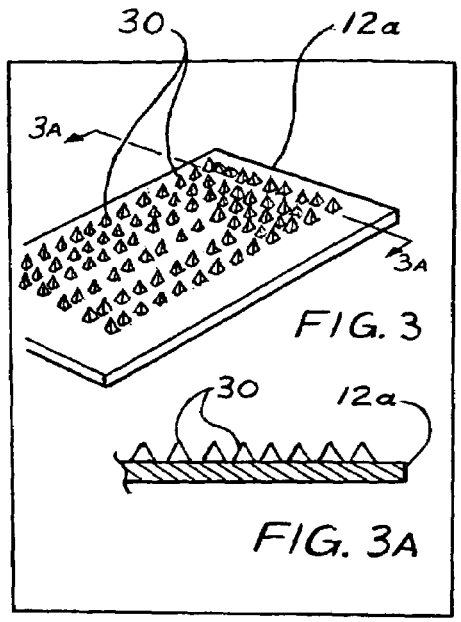
FIG. 3
FIG. 3A
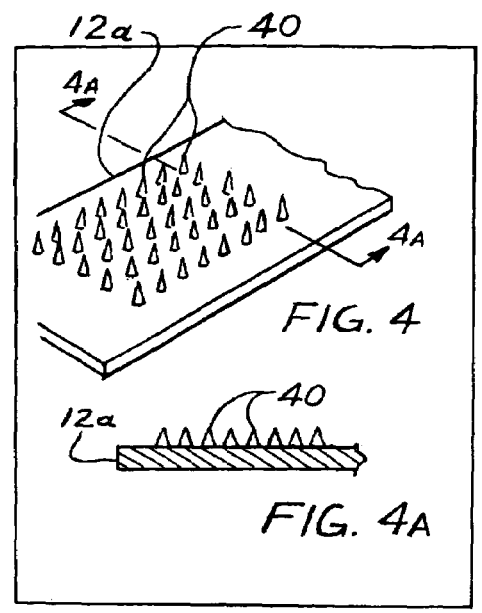
FIG. 4
FIG. 4A
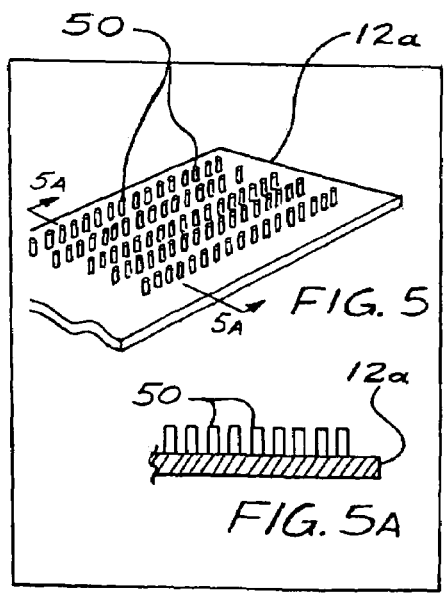
FIG. 5
FIG. 5A
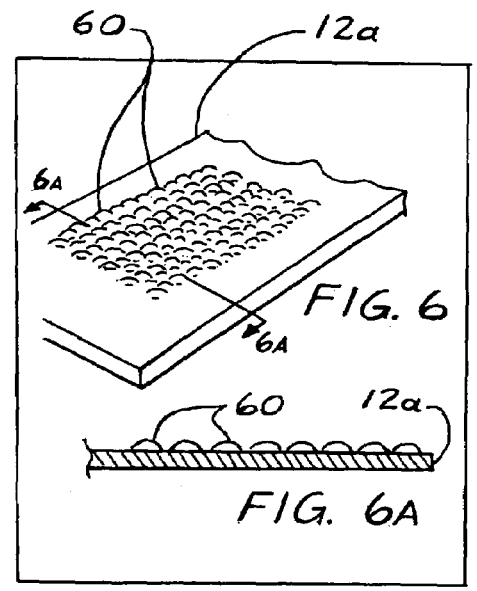
FIG. 6
FIG. 6A

APPARATUS AND METHOD FOR NOISE REDUCTION IN A VEHICLE

BACKGROUND

The present invention is in the field of noise reduction in vehicles generally, and in particular to apparatus and methods for reducing noise caused by vibration of wire harnesses and other conduits.

Vehicles such as automobiles contain long runs of HVAC ducts, cables, wiring and wire harnesses secured at spaced points to hidden surfaces and parts, for example underneath seats and steering columns, behind interior panels, and in engine compartments and trunks. Unsecured lengths of ducts, cables, wiring, wire harnesses and other conduits between fastener points are prone to vibration against adjacent hard surfaces when the vehicle is moving, resulting in noise problems known in the art as "BSR" (buzz, squeak, and rattle). Efforts to reduce the noise made by vibrating wire harnesses and other conduits typically involve increasing clearances to adjacent hard surfaces and parts, and/or wrapping the wiring with foam or a similar noise-reducing material.

Increasing clearances is often not practical due to space limitations, and often unsuccessful due to variations from ideal clearances that occur during installation.

Wrapping or cushioning the wiring with foam and similar materials increases the cost and complexity of the wire harness, adds weight, and in some cases might not fit existing clearances.

SUMMARY

In accordance with one aspect of the invention, a noise-reducing component is provided for a vehicle equipped with at least one conduit. The component includes at least one component surface which is adapted to be placed adjacent to a conduit when the component surface is installed in a vehicle. A plurality of texture structures are on the component surface. These texture structures define a plurality of spaced-apart contact surfaces for the conduit. The total surface area of the contact surfaces is less than the total area of the component surface. This reduction in surface area reduces noise caused by interaction between the conduit and the component surface.

In accordance with another aspect of the invention, a method is provided for installing a conduit in a vehicle. The method includes installing in the vehicle a component having a noise-prone surface with a plurality of texture structures, the texture structures defining a plurality of spaced-apart contact surfaces. The total surface area of the contact surfaces is less than the total area of the noise-prone surface. The method also includes installing in the vehicle a conduit adjacent to the vehicle component so that an unsecured portion of the conduit is in close proximity to the contact surfaces defined by the plurality of texture structures.

BRIEF DESCRIPTION OF THE DRAWINGS

FIGS. 3 and 3A are perspective and side elevation views of the noise-prone area of FIG. 2 with a first alternate surface texture.

FIGS. 4 and 4A are perspective and side elevation views of the noise-prone area of FIG. 2 with a second alternate surface texture.

FIGS. 5 and 5A are perspective and side elevation views of the noise-prone area of FIG. 2 with a third alternate surface texture.

FIGS. 6 and 6A are perspective and side elevation views of the noise-prone area of FIG. 2 with a fourth alternate surface texture.

DETAILED DESCRIPTION

Figure 1:
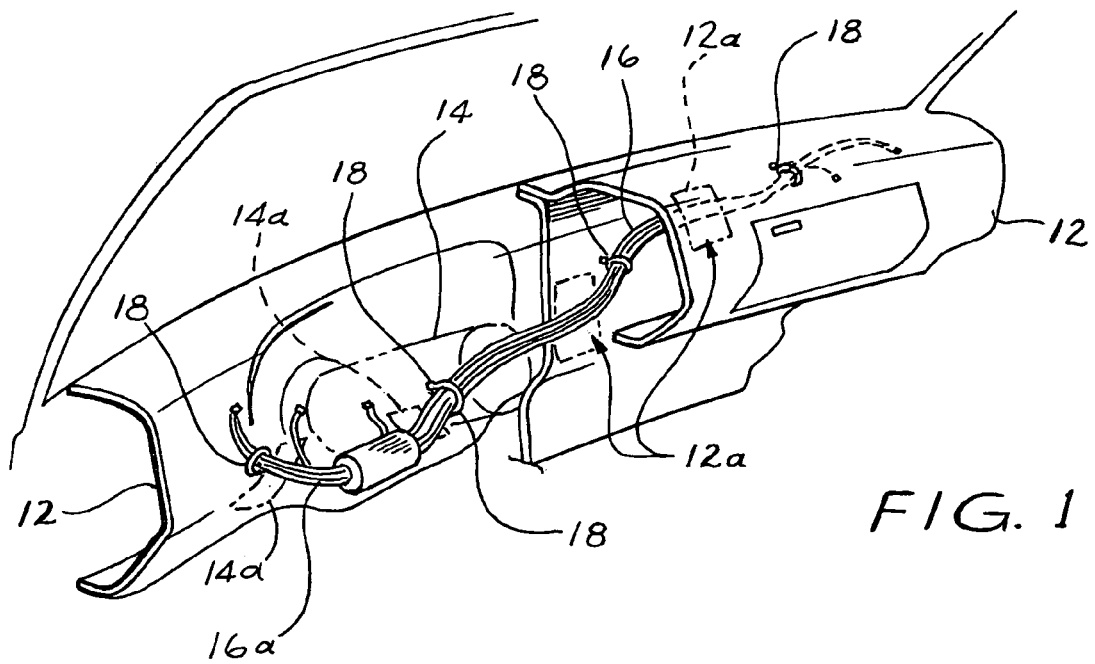
FIG. 1 is a perspective view of the passenger-compartment side of a vehicle instrument panel, with portions of the panel cut away to show a wire harness connected to hidden sides of the panel and the steering column.

FIG. 1 schematically illustrates a typical run of wire harness 16 along hidden portions of instrument panel 12 and steering column 14 of a vehicle 10. Wire harness 16 is secured at spaced points with conventional clips or other fastener means 18, as is well known in the art. Substantial portions 16a of the wire harness between clips 18 are accordingly unsupported, and given the somewhat flexible nature of a typical wire harness (which may be a single wire or a bundle of wires), the unsupported portions 16a are prone to movement and vibration against adjacent surfaces of instrument panel 12 and steering column 14. It is well known to the people who design and install wire harnesses in vehicles that certain areas of relatively hard panels and parts such as instrument panels 12 and steering column 14 are prone to making noise known as "BSR" (buzz, squeak, rattle) when in contact with an unsecured portion of wire harness 16. Examples of noise-prone areas are illustrated in phantom lines at 12a and 14a. Some of unsupported portions 16a may be covered with foam 16b or other similar noise-reducing material, as shown in FIG. 1.

It will be understood by those skilled in the art that other types of panel and part located throughout a vehicle can be subject to BSR noise problems, and that the invention described here in relation to an instrument panel and steering column part can be applied to such other panels and parts. It will also be understood that although the noise problems usually occur against plastic or metal parts, there may be other relatively hard materials used in a vehicle where wire harness noise can be a problem, and where the invention can be applied.

It will further be understood that while the typical noise problem is caused by wire harness vibration against an adjacent panel or part, it might also be caused by vibration of a panel or part against the wire harness, and that the invention described below will have the same effect and benefit.

Figure 9:
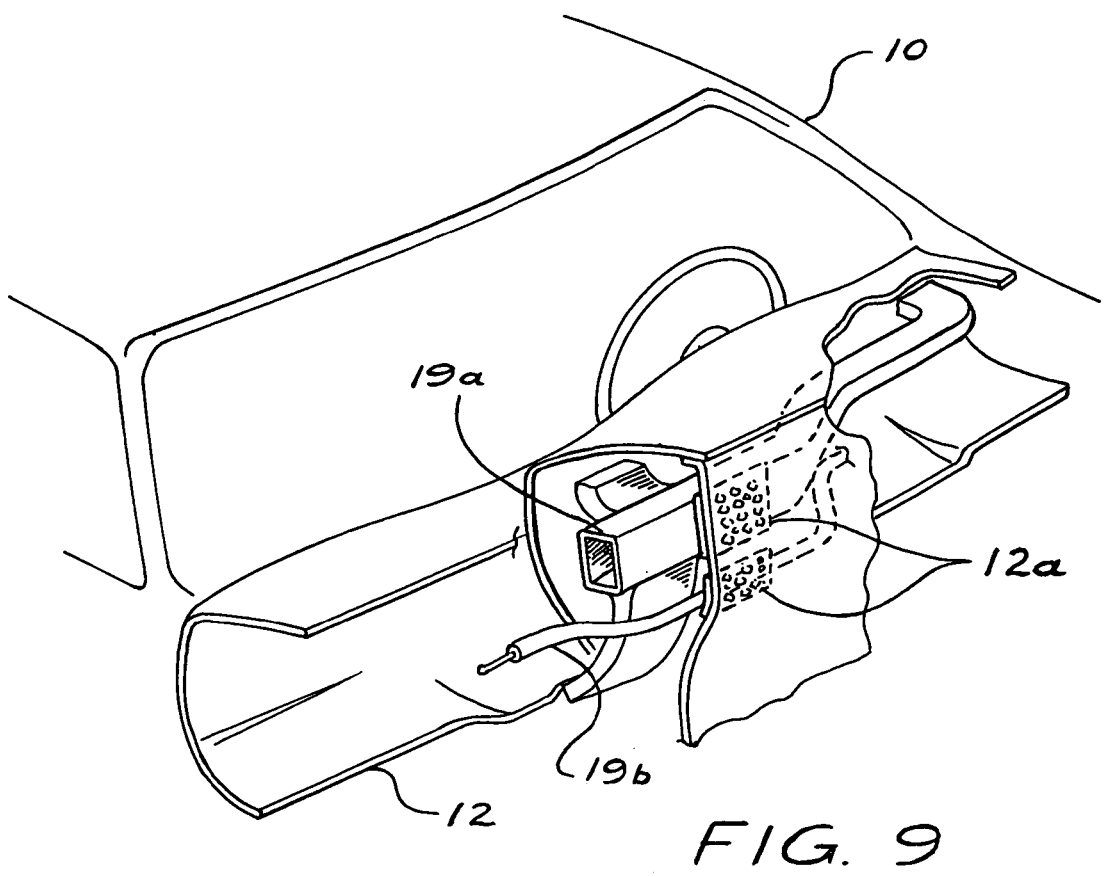
FIG. 9 is a perspective view of the passenger-compartment side of a vehicle instrument panel, with portions of the panel cut away to show an HVAC duct and a cable adjacent to hidden sides of the panel and the steering column.

Referring to FIG. 9, it will be seen that noise may also be caused by other types of elongated members running through a vehicle, including but not limited to HVAC ducts 19a and cabling 19b and other conduits. Such elongated members, whether wires, wire harnesses, ducts or other types of tubes, conduits or lines of any kind are referred herein as "conduits".

Figure 2:
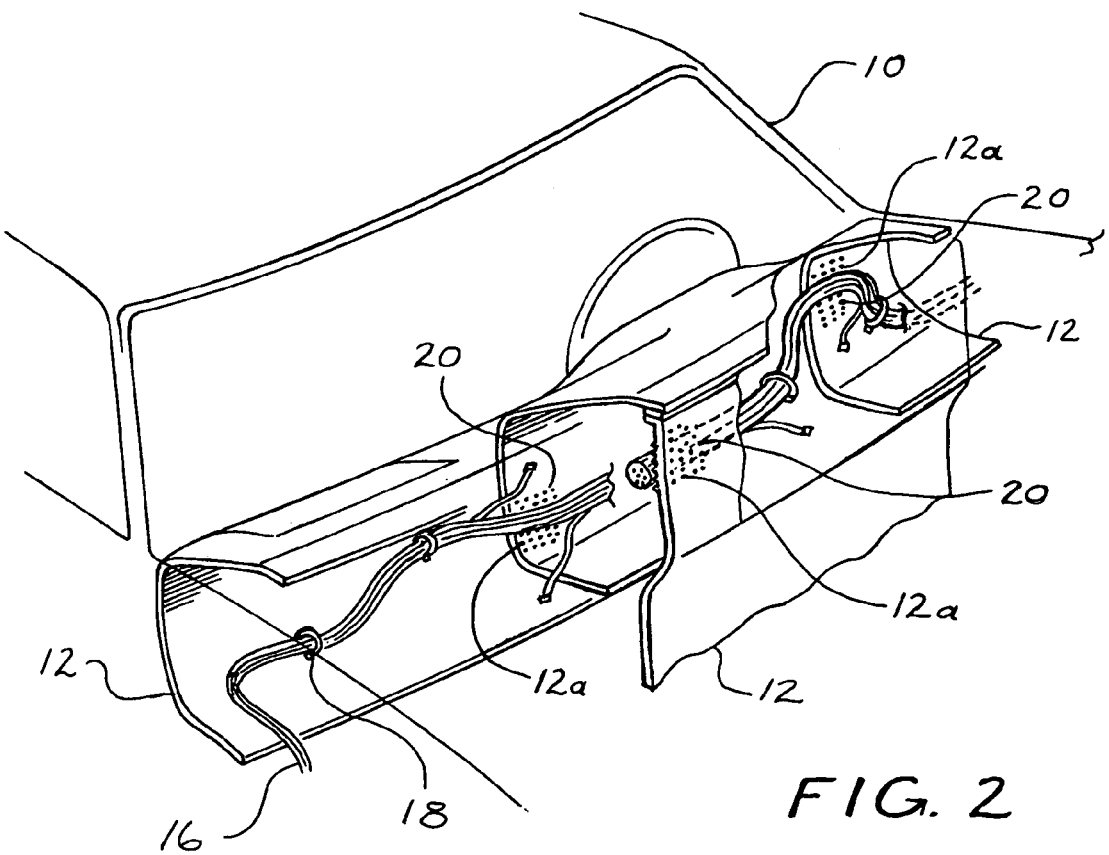
FIG. 2 is a perspective view of the engine-compartment side of the vehicle instrument panel of FIG. 1, illustrating a reduced area surface texture applied to noise-prone areas according a first embodiment.

Referring to FIG. 2, noise-prone areas 12a have been provided with a noise-reducing surface texture that reduces their original surface area in a manner reducing BSR noise caused by the wire harness. Surface texture is formed by a plurality of texture structures 20, which in this case are small spaced structures with spaced contact ends that define a reduced-area contact surface for wire harness 16. Texture structures 20 may be formed directly in the surface of the panel 12 or part 14, such that the material of the spaced structures is the material of the panel or part. This reduces or eliminates the need to apply additional costly and space-consuming soundproofing materials to the wire harness or to the panel or part.

Figure 2A:
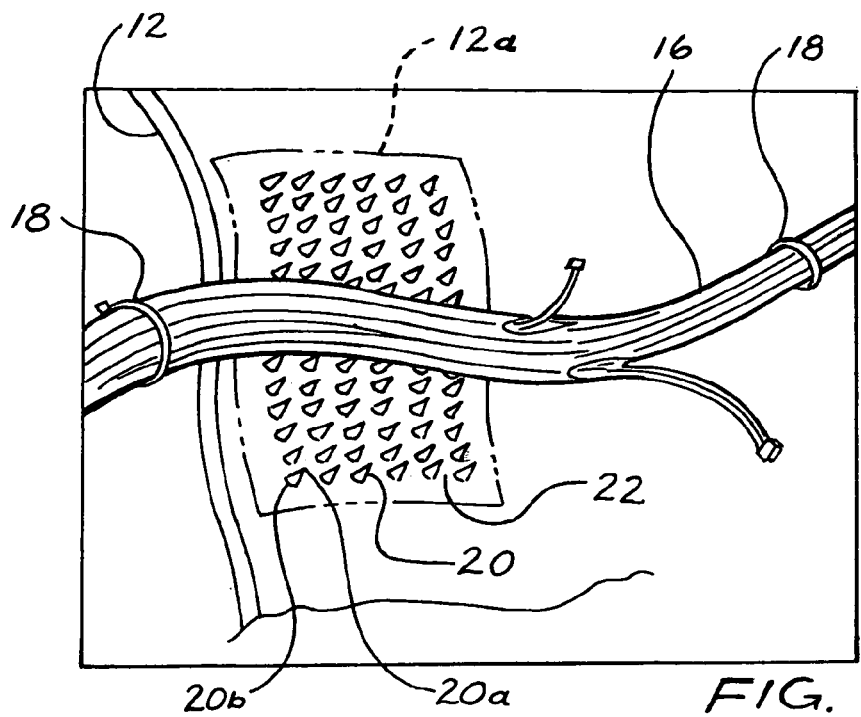
FIG. 2A is an enlarged detail view of one of the textured noise-prone areas of FIG. 2, showing structures raised from the original surface.
Figure 2B:
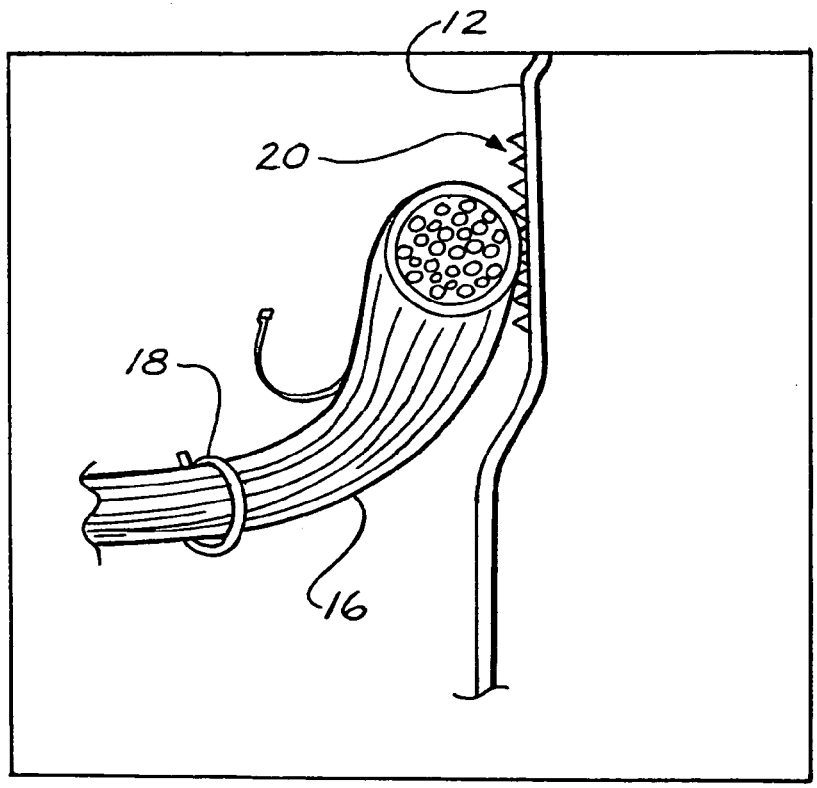
FIG. 2B is an end elevation view of the wire harness and textured area of FIG. 2A, with the wire harness sectioned.

FIGS. 2A and 2B show one of the noise-prone areas 12a from FIG. 2 in enlarged detail. Texture structures 20 are shown as being formed by a plurality of small spaced fingers or bristles or other projections whose tips or contact ends 20a extend from bases 20b arranged on an underlying surface 22 of noise-prone area 12a in a spaced array. Texture structures 20 in the illustrated embodiment are formed by molding it into the plastic material of panel 12, using any known molding technique available to those skilled in the art. Texture structures 20 are accordingly an integral part of the panel material, and can be formed while the instrument panel 12 is being originally manufactured.

It may also be possible to form texture structures 20 in a previously finished panel 12 in a separate operation, for example by machining the panel material or by insert-molding the structures.

Wire harness 16 may normally rest against ends 20a of texture structures 20 (FIG. 2B) as it would rest on the original flat panel surface of noise-prone area 12a, or it may be spaced from contact ends 20a of the structures while at rest and only come into contact with them when the wire harness (or the panel) is moving or vibrating. While the drawings generally show a wire harness resting on top of a horizontal array of texture structures 20 for convenience, it will be understood that the orientation of noise-prone area 12a relative to wire harness 16 is not important.

As shown in FIGS. 2A and 2B, the spacing of texture structures 20 (and more specifically the spacing of their contact ends 20a that form the contact surface for wire harness 16) results in a contact area for the wire harness over noise-prone area 12a that is significantly less than the original surface area. For example, if the underlying surface 22 of noise-prone area 12a has an area of 2500 $mm^2$, and structures 20 are cylinders with tip diameters of 1 mm and center-to-center tip spacing of 2 mm, the combined contact area presented to wire harness 16 over noise-prone area 12a is reduced to 531 $mm^2$, an approximately 80% reduction. This manner of reducing the contact area significantly reduces BSR noise.

Additionally, depending on the shape of texture structures 20 and the material of the panel or part from which they are formed, texture structures 20 may present a somewhat yielding reduced-area contact surface to wire harness 16, further reducing BSR noise. For example, longer, narrower texture structures 20 that feel and yield like brush bristles will tend to be quieter than shorter, thicker structures 20 formed as rigid columns or fingers.

The spacing of contact ends 20a should be less than the width or diameter of the wire harness, so that the wire harness rests on or strikes multiple contact ends 20a. The width or diameter of contact ends 20a can be less than the wire harness width or diameter.

Texture structures 20 are spaced in the sense that at least their contact ends 20a are spaced, although some or all of their base portions may be spaced as well. Alternatively, the base portions 20b may be wider than the contact end 20a and in that case the base portions of adjacent texture structures 20b may be in contact.

The use of texture structures 20 may permit a reduction in the use of noise-suppressing material such as foam 16b, resulting in cost-savings.

While the illustrated embodiment shows only small noise-prone areas such as noise-prone area 12a and 14a provided with noise-reducing textures according to the invention, it will be understood that larger areas, such as the entire path of a wire harness along a panel, or even an entire panel or part, could be provided with such a textured surface if desired.

FIGS. 3 through 6 illustrate some possible alternate shapes for structures 20, including pyramids 30 (FIG. 3), cones 40 (FIG. 4), cylinders 50 (FIG. 5), and hemispherical dimples 60 (FIG. 6). It will be understood by those skilled in the art that these examples are not exhaustive, and that any shape capable of being formed in a relatively hard surface of a panel or part, and that presents an array of spaced contact ends over an area prone to wire harness BSR noise, with the combined area of the contact ends being less than the original surface area, is within the scope of the invention. It will also be understood that the contact "end" of a particular structure may include more than a flat surface or clearly defined point, for example in the rounded structures 60 of FIG. 6 where some upper portions of the upper surfaces of the hemispheres below their tangential center-points may make contact with the wire harness. As shown in FIG. 3A, the base portion of texture structures such as structures 30 may be in contact with each other.

Figure 7:
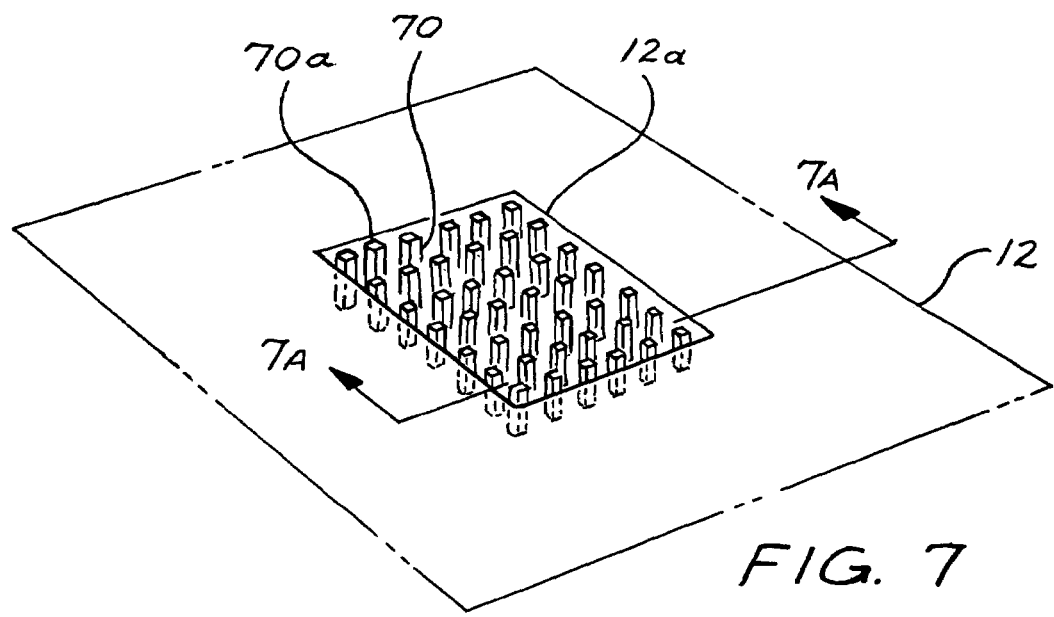
FIGS. 7 and 7A are perspective and side elevation views of the noise-prone area of FIG. 2 with an alternate surface texture similar to that in FIG. 5, but with structures recessed into the original surface.
Figure 7A:
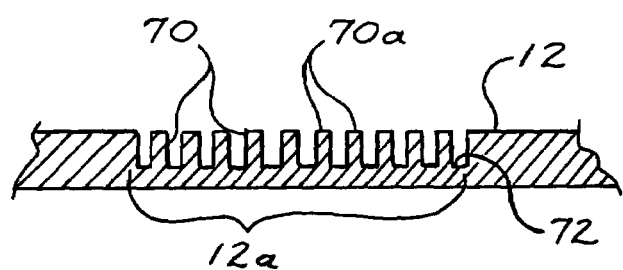

The examples of FIGS. 2 through 6 show structures 20, 30, 40, 50, and 60 that are raised from the original surface of noise-prone area 12a. There may be situations where the space allotted to wire harness 16 does not permit structures 20 to be raised from the original noise-prone surface. FIGS. 7 and 7A show an alternate manner of forming a noise-reducing texture in a panel or part, in which structures 70 in the form of narrow rectangular columns or fingers are created by removing material from the original noise-prone area of 12a, leaving the tips 70a of structures 70 at the original surface level, and leaving the originally designed clearance for wire harness 16 unchanged. It might also be possible to slightly reduce one or more portions of the surrounding surface of panel 12 to a level below the original surface of noise-prone area 12a, leaving contact ends 70a slightly higher than the surrounding panel surface.

Figure 8:
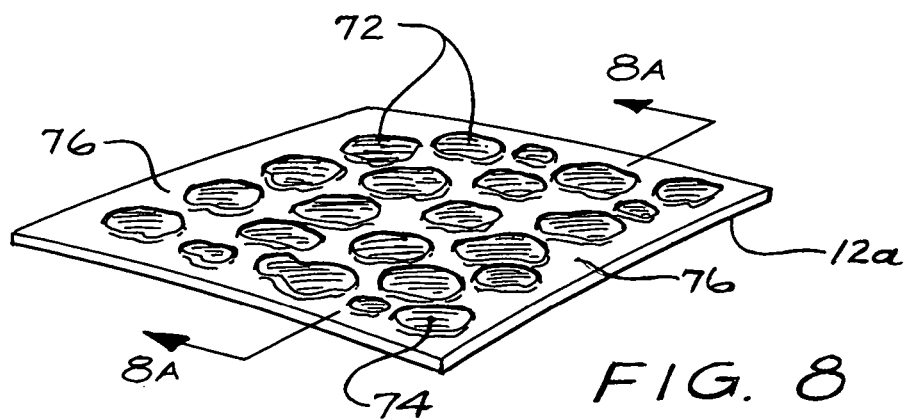
FIGS. 8 and 8A are perspective and side elevation views of the noise-prone area of FIG. 2 with a fifth alternative surface texture.
Figure 8A:
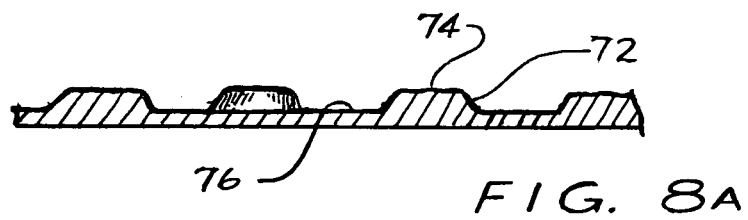

As an alternative to a plurality of small spaced structures 20, noise-prone areas of surface of panel 12 may have texture structures comprising regions 72 which define contact surfaces 74 having a different height (relative to the surface of panel 12) than interstitial regions 76 between contact surfaces 74, as shown in FIGS. 8 and 8a. In this case, regions 72 are raised relative to interstitial regions 76, which are even with the underlying surface of panel 12. This construction can be accomplished by any suitable method, such as molding the panel 12 with the desired texture or by superimposing raised regions 72 on the surface of panel 12 or by etching the surface of panel 12 to create interstitial regions 76, or by some combination of these. The shape of regions 72 and 76 may be irregular, continuous or discontinuous and may be separated, adjacent or intersecting. Many patterns of regions 72 and 76 may be used so long as the total area of contact surfaces 74 is less than the total area of underlying noise-prone surface of panel 12. In this manner, the surface area over which wire harness 16 or other conduit contacts panel 12 is reduced, thus reducing the noise created by the contact of wire harness 16 and panel 12.

What is claimed is:

1. A vehicle, comprising:
 a conduit including an unsecured conduit portion;
 a component having a surface placed in close proximity to the unsecured conduit portion; and
 a plurality of texture structures on the component surface, the textured structures defining a plurality of spaced-apart contact surfaces for the unsecured conduit portion; wherein the contact surfaces have a total area that is less than the total area of the component surface.

2. The vehicle of claim 1, wherein the plurality of texture structures comprises a plurality of small spaced structures formed on the component surface, the plurality of small spaced structures each having a contact end that defines a spaced-apart contact surface for the unsecured conduit portion.

3. The vehicle of claim 2, wherein the small spaced structures are flexible.

4. The vehicle of claim 2, wherein the small spaced structures are rigid.

5. The vehicle of claim 2, wherein the small spaced structures each include a base portion opposite the contact end, the base portion having a width greater than the width of the contact end, the base portions being configured on the component surface so that the base portions of adjacent small spaced structures are in contact.

6. The vehicle of claim 2, wherein the shape of at least one of the small spaced structures is selected from the group consisting of pyramids, cones, cylinders, and hemispherical dimples.

7. The vehicle of claim 1, wherein the plurality of texture structures are irregularly shaped.

8. The vehicle of claim 1, wherein the spacing of the contact surfaces from one another is greater than the individual width of each contact surface.

9. A method for installing a conduit in a vehicle, comprising:
 installing in the vehicle a component having a noise-prone surface with a plurality of texture structures, the texture structures defining a plurality of spaced-apart contact surfaces; wherein the contact surfaces have a total area that is less than the total area of the noise-prone surface; and
 installing in the vehicle a conduit adjacent to the vehicle component so that an unsecured portion of the conduit is in close proximity to the contact surfaces defined by the plurality of texture structures.

10. The method of claim 9, wherein the plurality of texture structures comprises a plurality of small spaced structures formed on the component surface, the plurality of small spaced structures each having a contact end that defines the spaced-apart contact surfaces for the unsecured conduit portion.

* * * * *